United States Patent [19]
Auerbach

[11] 3,992,106
[45] Nov. 16, 1976

[54] ERROR CANCELLING SCANNING OPTICAL ANGLE MEASUREMENT SYSTEM

[75] Inventor: Victor Auerbach, Middlesex County, N.J.

[73] Assignee: RCA Corporation, New York, N.Y.

[22] Filed: Sept. 30, 1974

[21] Appl. No.: 510,463

[52] U.S. Cl. .............................. 356/141; 356/144; 356/146
[51] Int. Cl. .......................................... G01b 11/26
[58] Field of Search .............. 356/1, 141, 152, 140, 356/144, 145, 146; 340/16

[56] References Cited
UNITED STATES PATENTS

| | | | |
|---|---|---|---|
| 3,536,406 | 10/1970 | Granqvist | 356/152 |
| 3,574,466 | 4/1971 | Peters | 356/152 |

Primary Examiner—Maynard R. Wilbur
Assistant Examiner—S. C. Buczinski
Attorney, Agent, or Firm—Edward J. Norton; Joseph D. Lazar

[57] ABSTRACT

An attitude determining system for vehicles, such as spacecraft or for ground-based environments measures the angle between a reference and the line-of-sight to a star or other celestial object of known position or to aircraft and missiles. The system includes a rotating scanning telescopic sensor, and a fixed mirror positioned so that the sensor scans both the direct and the reflected line-of-sight of the celestial object in the course of each rotation. Associated transducers and electronic circuits determine the relative angular positions of the telescopic sensor at the instants it detects the direct and the reflected radiation from the celestial object. A computation based on the two angles gives the angular position of the celestial object relative to the vehicle reference. The system cancels or substantially reduces errors due to optical or electronic inaccuracies which identically affect the direct and the reflected angular position measurements.

18 Claims, 10 Drawing Figures

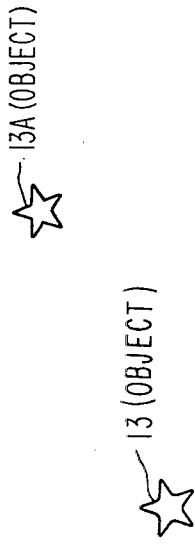
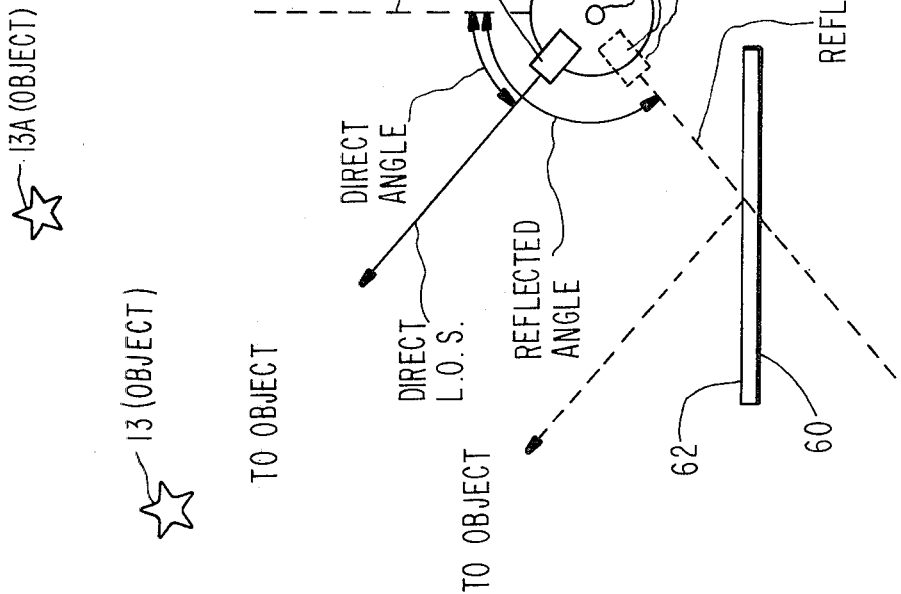
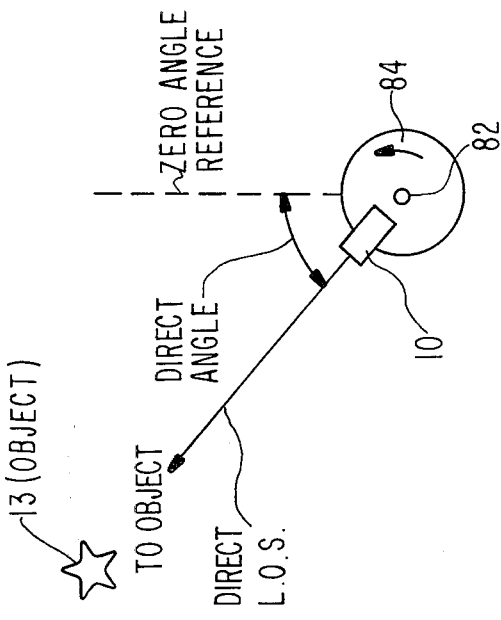

ERROR CANCELLING SCANNING OPTICAL ANGLE MEASUREMENT SYSTEM

BACKGROUND OF THE INVENTION

1. Field of the Invention

This invention relates to an optical scanning system for use with an attitude determining system of a vehicle, such as a spacecraft, and more particularly, relates to an optical scanning system effected by a mechanical scanner.

2. Description of the Prior Art

A complete vehicle attitude determining system must determine the vehicle orientation about three axes (usually designated pitch, roll, and yaw axes). For simplicity, the descriptions of the prior art, and of the present invention, will be in terms of single axis systems. Such descriptions will illustrate the salient principles, features, and advantages of the various systems. An extension and application of the principles of a single axis system to a multiple axis system are understood in the art.

Optical star trackers and scanning systems known in the art, make use of three basic methods for utilizing the information derived from the star field of particular application in satellite attitude sensing. By one method, one or more movable optical sensors or trackers are arranged to each lock onto a single identifiable star and a servo mechanism mechanically repositions the tracker to electrically null an error signal and thus to maintain the locked-on condition. The relative angle of the line-of-sight (LOS) of the star from the spacecraft is determined by measuring the angle of the tracker.

The second method is that of scanning the star field with no motion of the optical sensor relative to the spacecraft. As compared to the tracker method, a scanner may be a completely passive device mechanically. If attached to an earth-oriented spacecraft, the sensor scans a swath of the star field at the orbital rate, generating an output series of pulses corresponding to the stars that are sensed by the scanner. Such a scanning system is often termed a "mapper." The pulse pattern derived from the output is compared with a star catalogue and independent star-crossing times are identified. Such information is used to compute the relative angles of the LOS of identified stars.

In prior art systems using the third method, a mechanical scanning motion of the sensor is used, instead of the motion of the spacecraft, to provide the required scanning of the star field. This may be done with a moving reticle, or may utilize a mirror to scan, the mirror being mounted to a rotating wheel on the spacecraft such as the momentum wheel of a dualspun stabilized spacecraft.

A typical prior art device of the third type makes measurements using a telescope-type optical system focused on a slit or reticle in front of a radiation detector. The telescope assembly is rigidly mounted on a rotating platform, such as a momentum wheel of a spacecraft or other vehicle, so that its optical axis scans a plane, or a conical pattern, as the platform rotates. When the focused radiation of a celestial object (such as the sun, stars, or planets) crosses the slit or reticle line, the radiation detector generates an output pulse. If the instantaneous orientation of the platform is measured at the time of the detector output pulse, the LOS of the object, may be determined. The platform orientation measurement must be related to a known zero or reference orientation to the vehicle coordinates. A scanning system using such a device manifests errors due to unavoidable optical and mechanical irregularities and due to timing and threshold irregularities of the optical detector and associated electronic circuits.

SUMMARY OF THE INVENTION

The present inention provides for an improvement over an attitude sensor system of the third type (mechanically rotated scanner) by the addition of a fixed plane mirror parallel to the rotation axis. As the scanner rotates it alternately "views" the celestial object directly, and by reflection in the mirror. The scanner angle relative to the vehicle is measured for both the direct scan and the reflected scan of the celestial object and the difference of these two angles is used to calculate the object LOS angle relative to the vehicle. Most of the optical, mechanical, and electronic inaccuracies will identically affect the "direct" and the "reflected" angle measurements so that the effects of these inaccuracies will be cancelled when the two measured angles are subtracted. Other random errors are reduced by a factor of $\sqrt{2}$. Overall attitude sensor system calibration will primarily depend on the angle of the plane mirror relative to vehicle axes. Because the mirror position is fixed, this calibration may be accomplished by a simple static measurement using external optical equipment, and the calibration should be relatively stable and reliable.

BRIEF DESCRIPTION OF THE DRAWINGS

FIGS. 3A and 3B are simplified schematics of the optical geometry of a scanning attitude sensor system according to the invention as compared to the prior art.

DETAILED DESCRIPTION OF A PREFERRED EMBODIMENT

Figure 1:
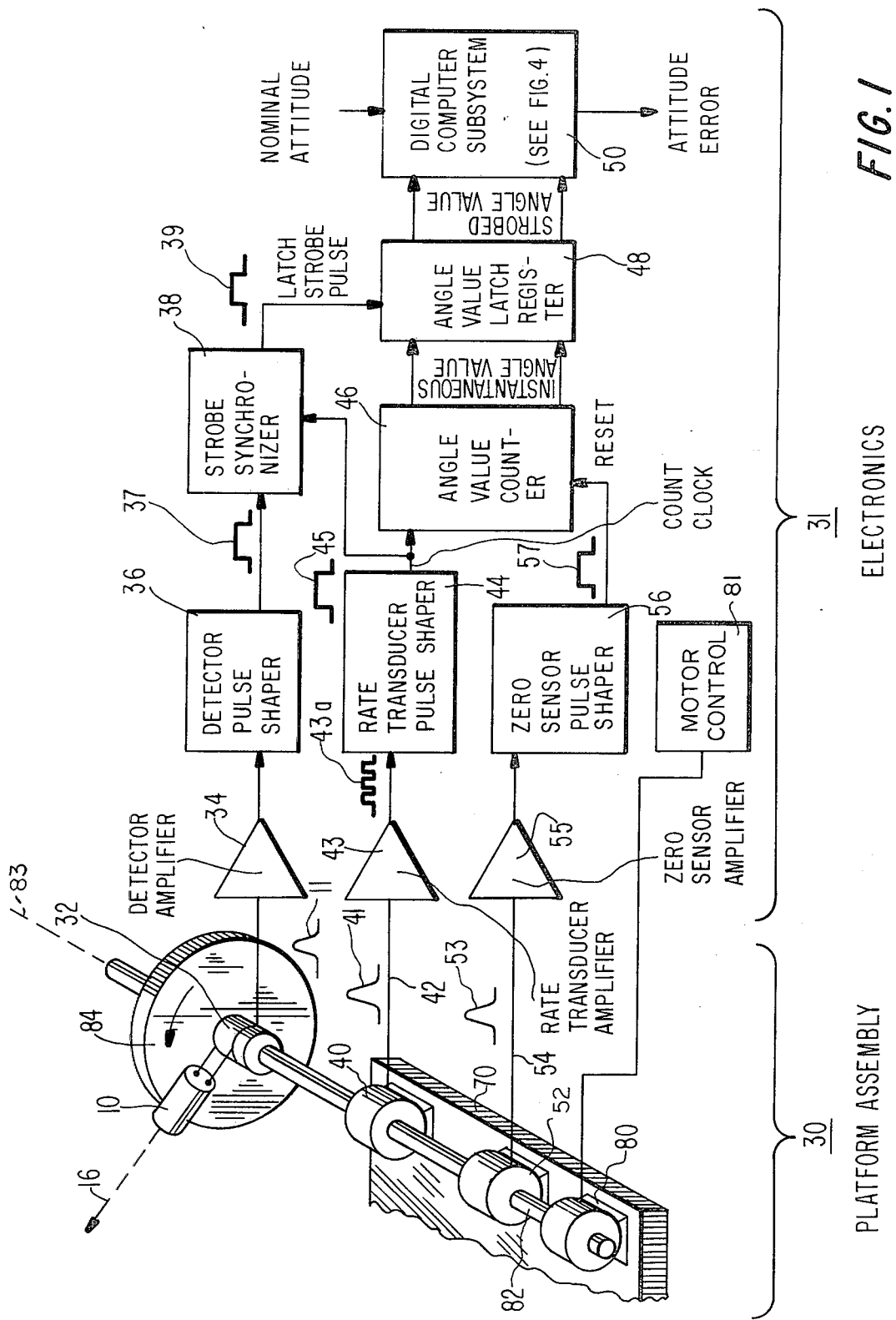
FIG. 1 is a functional block diagram of a typical scanning sensor system.
Figure 2:
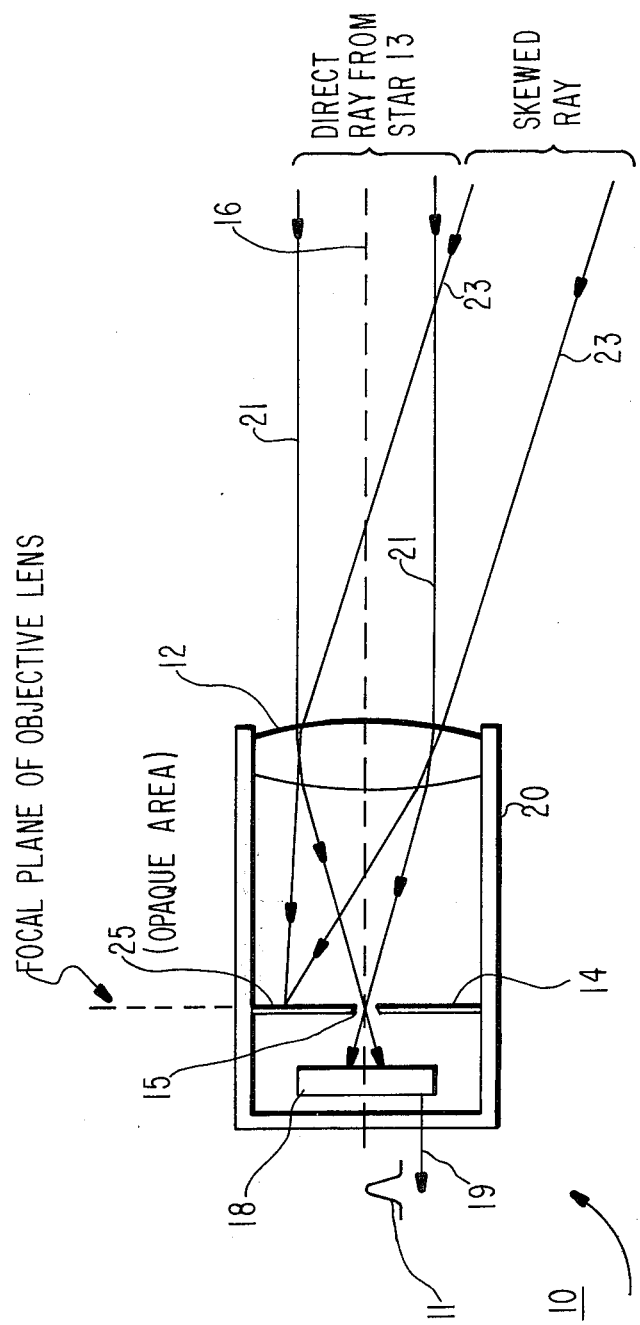
FIG. 2 is a schematic of a typical celestial object sensor telescope assembly.

Referring to FIG. 1, there is shown a block diagram of a typical scanning attitude sensor system of the type useful in practicing the present invention, as will be described. FIG. 2 is a schematic diagram illustrating the elements of a celestial object sensor telescope assembly of the type depicted in the system of FIG. 1. In particular, the sensor assembly 10, includes an objective lens 12 for focusing radiation from a remote object (such as a star 13) onto a reticle 14. The reticle 14 is opaque except for a slit or transparent central area portion 15 which allows radiation focused there to pass therethrough and to impinge on an optical radiation detector 18 as indicated by direct rays 21. Indirect rays 23 will not be detected by being focused on the opaque area portion 25 as shown. An electrical output signal 11 over output conductor 19 is generated by the detector 18 in response to radiation to which it is exposed such as the viewing of an object star 13. Enclosure housing 20 excludes extraneous radiation and maintains the proper position and alignment of the optical detector members 12, 14, and 18.

Sensor assembly 10 is mounted on a platform assembly 30 comprising in general the mechanical portions of the system as shown in FIG. 1. The platform assembly comprises shaft 82 upon which and rigidly attached thereto are the wheel 84, and the rotating parts of drive motor 80, reference sensor 52, and rotation rate transducer 40. The "stationary" parts of motor 80, sensor 52, and transducer 40 are mounted on vehicle body 70.

Drive motor 80 is powered by and controlled by electrical signals from a suitable motor controller 81 which thereby controls the duration, speed, and direction of motion of the rotating parts of assembly 30. Means for such control are well known in the art. In the preferred embodiment, being described, such motion is a unidirectional constant speed rotation, but alternative embodiments, including intermittent and reciprocating motion may be desirable for some applications. It will be appreciated that maximum error cancellation will occur if the rotational velocities at the time of scanning the direct LOS and the reflected LOS are equal. It will be further appreciated that with reciprocating motion the slip ring assembly 32 may be replaced by a flexible electrical cable.

The sensor assembly 10 is mounted on wheel 84 which when rotated at an appropriate rate causes the optical axis 16 to scan a plane or conical pattern in space. If the sensor optical axis 16 is fixed at 90 degrees to rotation axis 83 (as shown in the perspective view FIG. 3C of the preferred embodiment illustrated in FIG. 3B), the sensor axis 16 will scan a plane in space. If the sensor axis 16 is fixed at any angle other than 90 degrees to rotation axis 83 (as shown for example in an alternative embodiment, FIG. 3D) the sensor axis 16 will scan a conical surface in space. When this scan motion causes the optical axis 16 to be momentarily parallel with the line-of-sight (LOS) from an object 13, the radiation therefrom passes through slit 15 causing a momentary electrical output pulse 11. The output pulse is conducted by a suitable slip ring assembly 32 mounted on shaft 82 to a detector amplifier 34, the output of which is applied to a detector pulse shaper 36 being arranged to provide an output pulse 37 of uniform amplitude and substantially square wave form at substantially the instant of maximum radiation received by detector 18.

Rate transducer 40 provides a train of pulses 41 at a rate proportional to the rotational speed of shaft 82 and, thus, the rotation rate of sensor assembly 10 relative to the vehicle 70. The integrated (total) number of pulses generated in a given time interval is (N) times the angle through which the sensor 10 rotates during that time interval, where N is a proportionality constant in pulses per degree. The rate pulses 41 over conductor 42 from transducer 40 are amplifier and shaped by rate transducer amplifier 43 generating a pulse train 43a in N pulses per degree. Rate transducer pulse shaper 44 responding to pulse train 43a generates an output of pulses 45 serving as clock pulses which are applied both to an angle value counter 46 and as a second input to strobe synchronizer 38, the first input of which is the output pulse 37 corresponding to the sensed or viewed star 13. Each clock pulse 45 causes counter 46 to increase by one, the digital angle value number previously stored therein.

Zero angle reference sensor 52 generates a single pulse 53 over conductor 54 at a moment corresponding to a reference or "zero" position relative to vehicle body 70. Pulse 53 is amplified and shaped by zero sensor amplifier 55 and zero sensor pulse shaper circuit 56 respectively, providing an output signal pulse 57 for resetting counter 46. Thus, on the receipt of a reset pulse 57, the value number in counter 46 will be reset to zero at a time that the platform assembly 30 and thus sensor assembly 10 is at a zero or reference angle position.

The combined effects of the clock (45) and reset (57) pulses on counter 46 are to cause the value number in the counter at any instant to be approximately equal to N times the angle of platform assembly 30 relative to the zero angle or reference angle of the vehicle 70. It should be noted that the absolute rotation of the vehicle 70 within the time required for one complete rotation of the platform assembly 30 may be negligibly small. For applications where vehicle rotation is not negligible, the rotation of the vehicle 70 is determined by a suitable inertial sensor (not shown), the output of which is used to provide correction signals for the digital computer subsystem (50) to be described. The value number in counter 46 is, at all times, presented to an angle value latch register 48 and is transferred thereto by latch strobe pulse 39 generated by strobe synchronizer 38 responsive to the detector shaper output pulse 37. Strobe synchronizer 38 introduces suitably a very brief delay, as may be required in the latch strobe pulse 39 so that the transfer of the angle value number from counter 46 into latch register 48 will always occur when that number is stable and, more particularly, when that number is not being incremented by clock 45.

The angle value number stored in latch register 48 is subsequently transferred to a digital computer 50 where it is processed to determine the attitude offset of the vehicle, the offset being the difference between the desired vehicle attitude and the actual or measured vehicle attitude.

The various amplifiers, shapers, counters, registers, the synchronizer, as well as the computer, are suitably designed or selected from conventional sources and are considered state-of-the-art components well known and understood in this art.

Figure 3C:
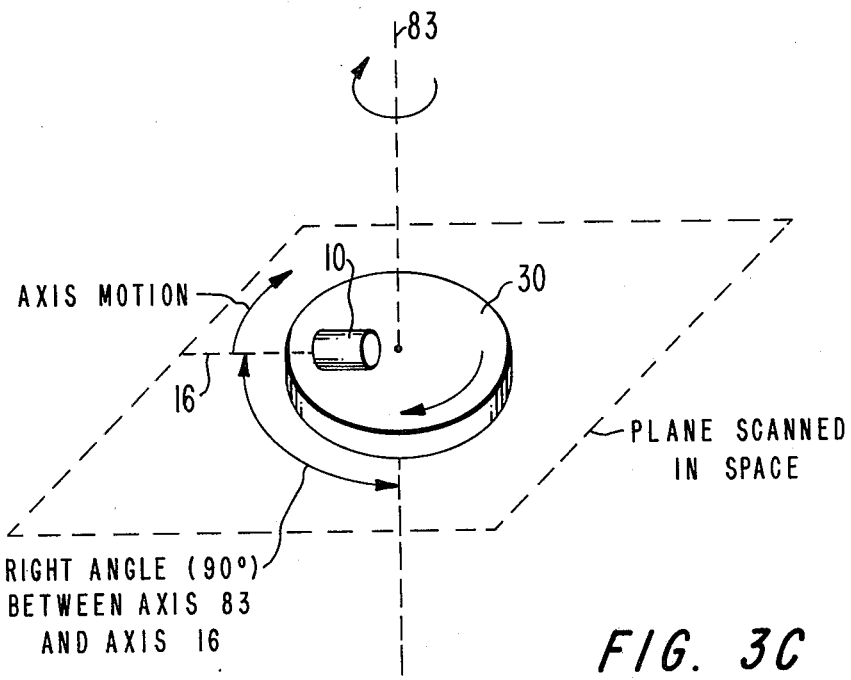
FIGS. 3C and 3D are simplified schematics of the geometry in perspective of the scanned pattern for the preferred embodiment and an alternative embodiment, respectively.
Figure 4B:
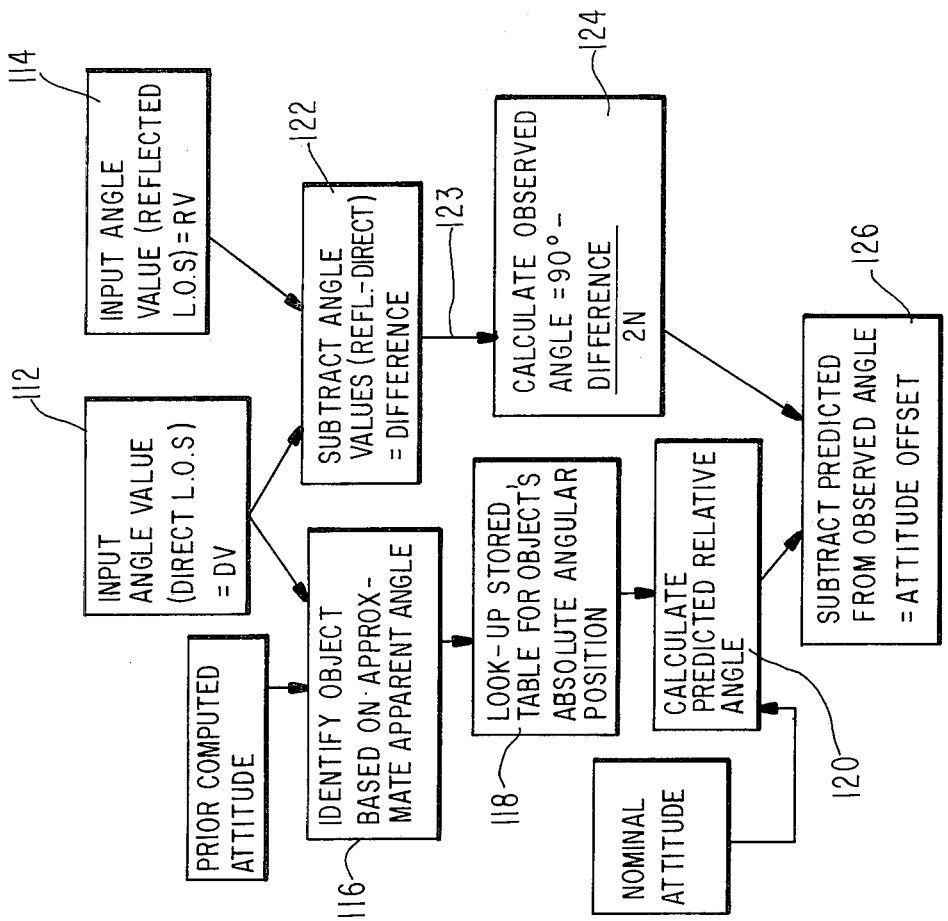
FIG. 4B is a simplified typical flow chart for the determination of attitude offset in accordance with the present invention.
Figure 4A:
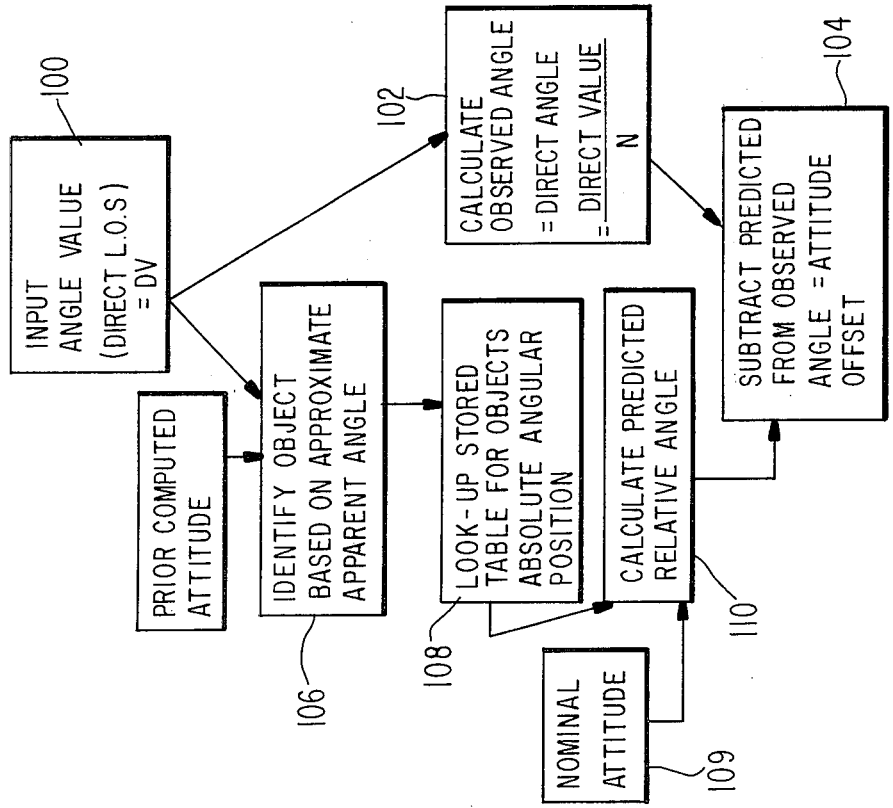
FIG. 4A is a simplified typical flow chart for the determination of attitude offset by a digital computer subsystem utilizing the scanning attitude sensor system output data according to the prior art.

TYPICAL PRIOR ART SYSTEM OF FIGS. 3A and 4A

The optical geometry of a typical prior art mechanical scanner is shown in FIG. 3A and the typical digital computer flow chart is shown in simplified form in FIG. 4A.

The angle value transferred to computer 50 FIG. 1) is one resulting from a detector output pulse 39 caused by the sensor optical axis 16 being aligned with the direct viewed line-of-sight (LOS) to an object such as star 13. This value may be defined as the "direct angle value." The corresponding "observed direct angle" is determined by calculation (block 102) in the computer 50 by dividing the direct angle value by the proportionality constant N.

Computer 50 also uses the direct angle value to identify object 13 by its approximate, apparent angle (block 106). The absolute angular location of the object 13 is then determined by the computer, utilizing a stored table of data (block 108) comprising known object angles. The desired or nominal attitude of the spacecraft vehicle angle (block 109) is subtracted from the absolute angle position by the computer 50 to calculate (block 110) the predicted relative angle of the object 13 to be viewed. Finally the predicted relative angle is subtracted (block 104) from the directly "observed" angle to determine the vehicle's attitude. The flow chart illustrated in FIG. 4A of the several steps of the computation described above are shown for convenience as blocks 100, 102, 104, 106, 108, and 110.

There are several principal errors that occur in such a system of the prior art. These errors may be grouped into several general types as follows:

1. Uncalibrated angular offsets of the alignment of the optical components.
2. Errors due to the misalignment and jitter of the rate transducer 40.
3. Uncalibrated changes in timing delays in the detector 18 and the subsequent electronic components, generally indicated by reference numeral 31 in FIG. 1, but not including the digital computer 50.
4. The random jitter in timing of the radiation detector amplifier and pulse shaper, the rate transducer, its amplifier and pulse shaper, and the zero sensor, its rate amplifier and pulse shaper.

These errors will be discussed in detail in comparison with the structure of the optical arrangement according to the present invention, to be described.

Optical System of the Present Invention (FIGS. 3B and 4B)

The optical geometry of the preferred embodiment of the invention and the digital computer flow chart in simplified form are shown in FIGS. 3B and 4B. FIG. 3C shows the geometry of FIG. 3B in perspective as projected on to a plane normal to the rotation axis 83 of platform assembly 30. A plane mirror 60 is suitably positioned in a fixed nonmovable relation to the vehicle body 70 such that its reflecting surface 62 is parallel to the rotation axis of platform assembly 30, more particularly, parallel to the longitudinal axis of shaft 82. In the embodiment illustrated, the plane of mirror 60 is normal to the zero angle reference of the vehicle.

Mirror 60 is so located relative to the wheel 84 so that as wheel 84 is rotated about shaft 82 by motor 80 the optical axis 16 of the sensor 10 is made to scan about a plane or cone. The sensor and its optical axis will successively occupy a first position as represented by the solid lines in FIG. 3B and a second position as indicated by the dotted lines in FIG. 3B. At the first position, position 1, the optical axis 16 is momentarily parallel to the direct LOS from object 13 and radiation from the object causes a detector output pulse 11 (FIG. 1) as described above. At the second position of sensor 10, position 2, axis 16 is momentarily parallel to the LOS from object 13 as reflected by mirror 60, the reflected radiation causing a second detector output pulse 11. If the plane mirror 60 has negligible aberrations and its reflectivity is sufficiently high, the reflected radiation will be optically identical to the direct radiation and the second detector output pulse 11 will, accordingly, be identical in all respects except timing to the first detector output pulse caused by the direct viewing of object 13. If the imperfect reflectivity of mirror 60 attenuates the reflected radiation sufficiently to significantly impair the equality of the two detector output pulses the error cancellation (elaborated below) may be degraded. If desired, detector pulse equality may be improved by either of two procedures as follows:

1. An optical filter may be interposed in the path of the direct radiation to match the optical attenuation caused by mirror 60; or,
2. The detector output may be electrically attenuated while scanning the direct radiation.

The "direct" and the "reflected" detector output pulses are processed in identical manner by the detector amplifier 34, shaper 36, and strobe synchronizer 38, to cause the angle value latch register 48 to successively transfer a direct angle value and a reflected angle value to the digital computer 50 as indicated in flow diagram (FIG. 4B) block 112 and 114.

The direct angle value is processed in computer 50 to identify the object 13 and to calculate the predicted relative angle of object 13 as indicated by flow diagram blocks 116, 118, and 120 in the same manner as the calculations are performed in the prior art described for blocks 106, 108, and 110 of FIG. 4A. It will be appreciated that object 13, identified by the computer operation in flow diagram block 116 in FIG. 4B, may be one of several such objects potentially useable for attitude determination in accordance with the present invention. FIG. 3B shows one such object 13 selected for use, and a second such object 13A which has not been selected. It will be further appreciated that computer 50 may use timeshare techniques well known in the art to select two or more objects 13, 13A, etc., in succession and to compute attitude relative to each such object. Each such object must have its LOS angle differ from the LOS angle of the other objects so that the optical axis 16 is aligned with the direct and reflected radiation from each object at different times. In accordance with the present invention, a calculation of the observed angle of object 13 is provided as indicated by flow diagram blocks 122 and 124. This is achieved by subtracting from the reflected angle value block (114), the direct angle value (block 112), dividing the difference by twice the proportionality constant N, and subtracting the result from 90°.

In application where the remote object 13 is not sufficient distant from platform assembly 30 to render the effects of parallax thereby between the direct LOS and the reflected LOS negligible, it will be appreciated by those skilled in the art that computer 50 may be arranged to provide suitable corrections as required to compensate for parallax. This compensation may be provided, for example, in the output of the flow diagram block 124.

It should be appreciated that in accordance with the present invention, the subtraction of the two angle values is significant in that it results in the automatic cancellation of many system error components and, in addition, the automatic reduction of other components by as much as $2^{-0.5}$ (i.e., $\sqrt{2/2}$) as will be elaborated below. The observed angle is used in the calculation to determine the attitude offset in flow diagram block 126 by the subtraction of the predicted value from the observed value of the angle.

The following table summarizes the various error components and the relative error magnitude that is attributable to each such component for the prior art system in comparison to a system embodying the improvement of the present invention.

SCANNING ATTITUDE SENSOR SYSTEMS COMPONENTS

| Error Component (Drawing Reference Numeral) | Relative Error Contribution: Prior Art System FIGS. 1, 2 & 3A | Relative Error Contribution: Present System FIGS. 1, 2 & 3B |
|---|---|---|
| UNCALIBRATED ANGULAR OFFSET OF: | | |
| 1. Telescope Axis - (16) | 1.0 | 0.0 |
| 2. Reticle Line or Slit - (15) | 1.0 | 0.0 |
| 3. Zero Reference Sensor - (52) | 1.0 | 0.0 |
| 4. Plane Mirror - (60) | 0.0 | 1.0 |
| RATE TRANSDUCER (40): | | |
| 5. Overall Offset | 0.0 | 0.0 |
| 6. Random Jitter of Angular Steps | 1.0 | 0.7 |
| 7. Quantizing Error | 1.0 | 0.5–1.0 |
| UNCALIBRATED CHANGES IN TIMING DELAYS OF: | | |
| 8. Optical Radiation Detector - (18) | 1.0 | 0.0 |
| 9. Detector Amplifier - (34) | 1.0 | 0.0 |
| 10. Detector Pulse Shaper - (36) | 1.0 | 0.0 |
| 11. Strobe Synchronizer - (38) | 1.0 | 0.0 |
| 12. Rate Transducer Amplifier - (43) | 0.0 | 0.0 |
| 13. Rate Transducer Pulse Shaper - (44) | 0.0 | 0.0 |
| 14. Zero Sensor Amplifier - (55) | 1.0 | 0.0 |
| 15. Zero Sensor Pulse Shaper - (56) | 1.0 | 0.0 |
| RANDOM JITTER IN TIMING OF: | | |
| 16. Radiation Detector (18) - Amplifier (34) - Pulse Shaper (36) | 1.0 | 0.7 |
| 17. Rate Transducer (40) - Amplifier (43) - Pulse Shaper (44) | 1.0 | 0.7 |
| 18. Zero Sensor (52) - Amplifier (55) - Pulse Shaper (56) | 1.0 | 0.0 |

Error components, numbers 1, 2, 3, 8 to 11 inclusive, 14, 15, and 18 of the table are applicable to the prior art system, but are reduced to zero in the present system by cancellation as follows: An angular offset or timing delay change of these components will result in the latch strobe pulses (39) (for both the direct LOS and the reflected LOS) being uniformly advanced or retarded from their "correct" positions, and the angle values strobed into latch register (48) (and then transferred to computer subsystem (50)) being uniformly too low or too high. When the direct angle value is subtracted from the reflected angle value in flow diagram block 122, the error of one will be subtracted from the equal error of the other, thus cancelling it. It should be noted that for error components 8, 9, and 10 to apply identically to the direct LOS sensing and the reflected LOS sensing, the celestial object sensed must be symmetrical with respect to the direction of scan. This symmetry obtains for stars, but not for an earth horizon or lunar limb. For unsymmetrical objects the error cancellation may be incomplete.

Error components, numbers 5, 12, and 13 have zero net effect for both the prior art and the present system since these will result in a uniform advance or retard of clock pulses (45) without altering their frequency. Aside from quantizing errors, (listed separately as number 7), the angle value transferred to register 48 will depend only on the product of clock frequency and the time interval between reset pulse 57 and latch strobe pulse 39. Error components 6, 16, and 17 will affect only the direct angle value for the prior art system, but will affect both the "direct" and the "reflected" angle values for the present system. Since these are random errors they will add on an RMS basis in flow diagram block 122 to total $\sqrt{2}$ times the equivalent error for the prior art system. However, the prior art system divides the direct value by constant N (in block 102) while the present system divides the "difference" angle value by constant 2N (in block 124) so that the relative final error component is halved. Thus, the present system has a net random jitter error of $\sqrt{2}/2 = 0.707$ times that of the prior art system.

Error component 7 will depend on the relative mechanical alignment or "phasing" of the rate transducer relative to the plane of the mirror (60) and the alignment of the sensor optical axis (16).

Error component 4 is the only one not applicable to the prior art system but applicable to the present system. The absolute magnitude of this error component should be reducible to a very small value because the precise fabrication and alignment of plane mirrors is a well established prior art procedure.

Figure 3D:
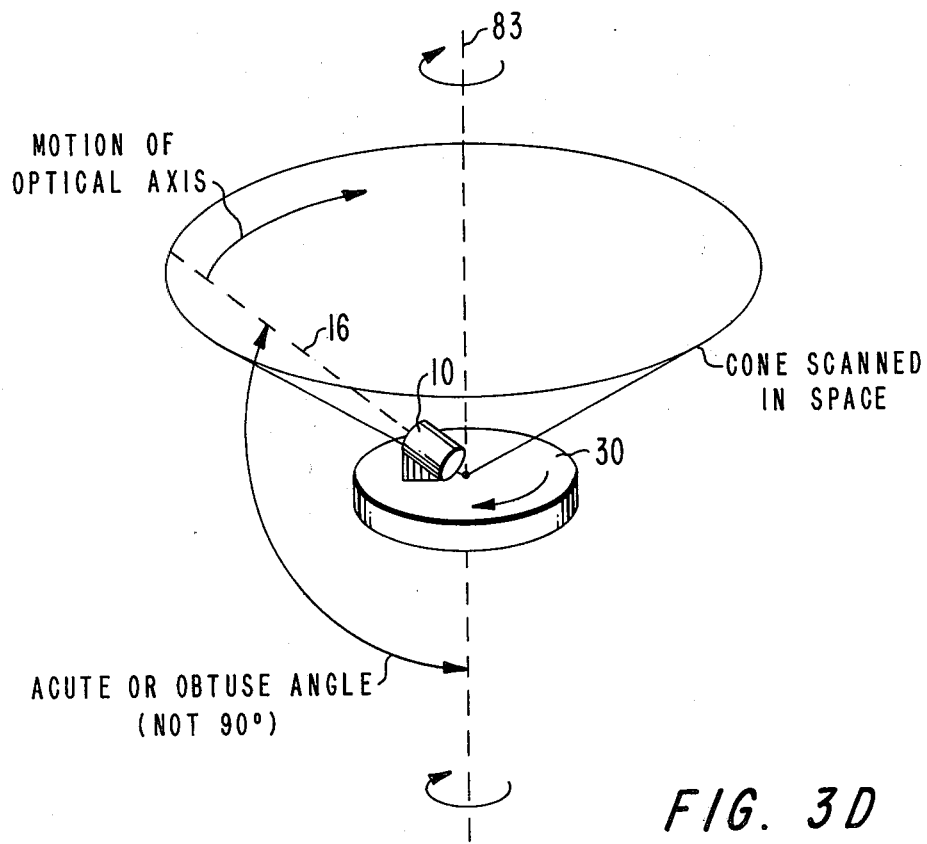
Figure 3E:
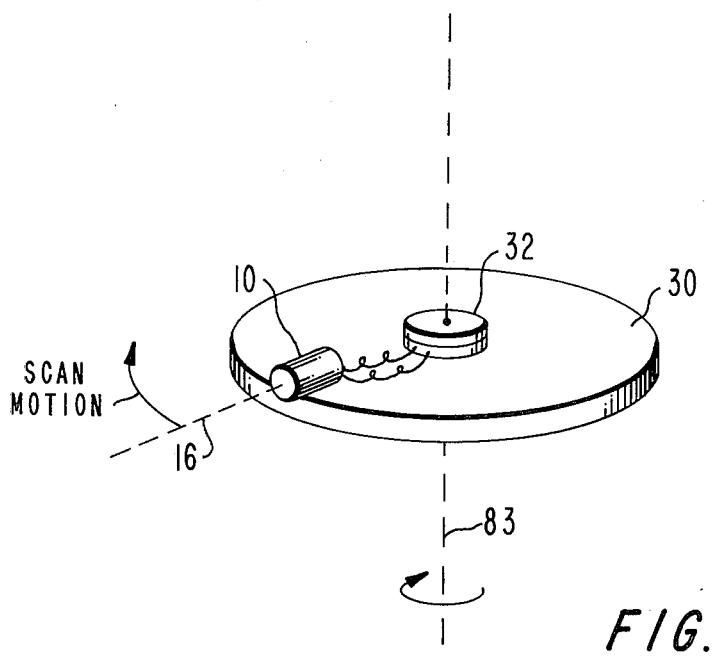
FIGS. 3E and 3F are simplified schematics of the means for scanning the sensor axis for the preferred embodiment and for another alternative embodiment, respectively.
Figure 3F:
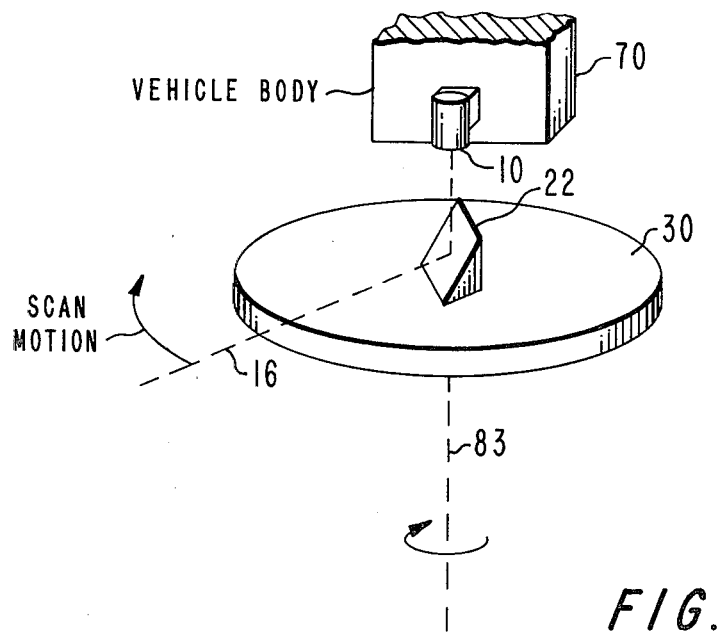

While the preferred embodiment of the invention described provides for scanning the optical axis 16 by physically affixing the sensor assembly 10 to rotating platform assembly 30, as shown in FIG. 3E, it will be appreciated that an equivalent scan motion of axis 16 may be effected by an alternative embodiment, as shown in FIG. 3F wherein the sensor 10 is fixed in a stationary relative position on the vehicle or platform 70, the scanning of the sensor optical axis 16 being effected by a suitable optical deflection device such as a moving plane mirror or prism 22. It will be further appreciated that the stationary position of sensor 10 obviates the need for slip ring assembly 32. Further, the scanner may be arranged to describe a conical surface or a plane surface as shown in FIGS. 3D and 3C, respectively--; and delete "scan" and insert --optical axis 16 by suitable selection of the angle of scan relative to the rotation axis 83 as previously described. In addition, to functioning as a vehicle attitude sensor, the invention may be utilized aboard spacecraft for detecting flexure of a solar panel array or antenna structure extending outwardly from the spacecraft body. Further, the invention may be utilized in a ground based environment to determine the relative angular position of a remote object such as an aircraft or missile, a suitable sensor being arranged to respond to a single emanating from the object in the acoustical or electromagnetic spectrum. Further, the scanner may be operated on a continuous or intermittent basis as desired. Further, in addition to determining the attitude by responding to radiation from a single celestial object, a plurality of such objects (stars) may be scanned at different times in the sequence of the scan, the computer being thus arranged to provide the appropriate respective calculations on a time-shared basis.

What is claimed is:
1. A vehicle attitude determining system comprising in combination:
   a. a radiant energy sensor scanning a prescribed field of view;
   b. means for exposing said sensor to a direct line-of-sight of an object within said field of view and generating a first signal responsive to radiant energy from said object;
   c. means for exposing said sensor to a reflected line-of-sight of said object at a time different from the time of exposure to said object along said direct line-of-sight and generating a second signal responsive to radiant energy from said reflected line-of-sight; and d. means responsive to said first and second signals for calculating the angle of said line-of-sight relative to a local angular reference on said vehicle.

2. A system according to claim 1 wherein said sensor is mounted on a rotating assembly about an axis fixed relative to said vehicle.

3. A system according to claim 2 wherein said reflected line-of-sight means includes a plane mirror fixedly mounted on said vehicle parallel to said rotation axis and positioned to be exposed to radiant energy from said object and to reflect such energy to said radiant energy sensor when said sensor is rotated to a position where said optical axis is aligned with the reflected line-of-sight of said object.

4. A system according to claim 23 wherein said calculating means includes:
 a. a transducer for generating reference clock pulses at a rate proportional to the rate of rotation of said wheel;
 b. a reference device for generating a signal marking the instant when said sensor optical axis is aligned with said vehicle reference;
 c. means responsive to the electrical output of said sensor for generating a strobe pulse when said sensor responds to radiant energy;
 d. means responsive to the electrical output of said reference device for generating a reset pulse;
 e. a counter responsive to said clock pulses for determining a count representing the angle of rotation of said sensor, said counter being reset by said reset pulse;
 f. a register responsive to said strobe pulse for storing the value of the count of said counter and for transferring said counter values to a digital computer; and
 g. a digital computer for determining the vehicle attitude by a computation, said computation including a subtraction of two count values transferred to the computer from said register, wherein the first such count value represents the rotation angle of said sensor when exposed to radiant energy from said object along the direct line-of-sight, and the second such count value represent the rotation angle when exposed to radiant energy along the reflected line-of-sight.

5. A system for measuring the angle about a given measurement axis of line-of-sight (LOS) to a remote radiating object, relative to a local angular reference, comprising:
 a. a plane reflector fixed at a known angle relative to the local angular reference;
 b. a directional radiant sensor, having a sensitive axis for generating an electrical signal when said sensitive axis is aligned with incident radiation from said remote radiating object;
 c. means for mechanically scanning at a constant angular speed said sensitive axis of said radiant sensor such that at a first instant said axis is aligned with the direct LOS to said remote object, and at a second instant said axis is aligned with the LOS to the image of said remote object in said plane reflector;
 d. a means for generating a digital electrical signal representing the instantaneous angle of the radiant sensor axis relative to the local reference;
 e. means responsive to said radiant sensor electrical signal for sampling said digital electrical signal at a first and second instant; and
 f. means for calculating the angle of the remote object LOS relative to the local angular reference by subtracting one of said sampled signals from the other sampled signal;

whereby certain types of invariant errors including mechanical misalignment of the sensor axis, and an uncalibrated delay in sensor electrical output are substantially reduced by the subtraction of the equal error components in the first and second angle values, thereby enhancing the accuracy of the calculated angle, and, further, whereby random errors affecting the measurement of angle values are reduced in that when one of the two sampled angle values is subtracted from the other, the random error components add on a root-mean-square (RMS) basis while the actual angle value components add directly.

6. A system according to claim 5 wherein the local angular reference is the body of a vehicle, such as a spacecraft, and the remote radiating object is a star, planet, or other celestial object of known angular position, and wherein said calculating means determines the absolute attitude of said vehicle body by calculating the angle of the remote object LOS relative to the local angular reference.

7. A system according to claim 5 wherein calculating means measures the position of the remote object by calculating the angle of the remote object LOS relative to the local angular reference.

8. A system according to claim 5 wherein said remote radiant object radiates electromagnetic energy.

9. A system according to claim 5 wherein said scanning means is continuous.

10. A system according to claim 9 wherein said scanning means includes means for interrupting said scanning means for selected periods during which said selected periods said sensor is stationary.

11. A system according to claim 5 wherein said scanning means is unidirectional.

12. A system according to claim 5 wherein said scanning means is reciprocating.

13. A system according to claim 5 wherein said scanning means is arranged to cause the sensor axis to describe a conical surface in space, the angle between said sensor axis and the axis of said scanning means being less than 90 degrees, and wherein said calculating means calculates the angle of the projection of the object LOS onto a plane normal to the scanning axis relative to the local angle reference.

14. A system according to claim 5 wherein said scanning means is arranged to cause the sensor optical axis to described a plane surface, the angle between said sensor axis and the axis of said scanning means being 90°.

15. A system according to claim 5 wherein said means for generating digital electrical signals includes:
 a. a rate transducer having a stationary portion fixed relative to the local angular reference and a rotating portion coupled to said radiant sensor and having means for generating an electrical output pulse for each uniform increment of motion of the rotating portion relative to the fixed portion;
 b. electronic circuit means for amplifying and shaping the rate transducer electrical output pulses;

c. a counter circuit for accumulating a count of said amplified and shaped pulses; and d. a zero position reference sensor including an associated amplifier and pulse shaper for resetting said counter circuit to zero count whenever the radiant sensor is at a predetermined reference position relative to the local angular reference.

16. A system according to claim 5 wherein said directional radiant sensor comprises:

a. an optical radiation detector for generating an electrical output in response to impinging radiation;

b. an opaque reticle having a transparent slit for passing radiation to said detector;

c. optical means for focusing radiation from a remote radiating object to a point on the surface of said reticle; and d. an enclosure housing for maintaining the positions of said detector, reticle, and optical means and for excluding extraneous radiation from the detector.

17. A system according to claim 1 wherein said radiant sensor is fixed in a stationary position relative to said local angular reference; and further including means for scanning said sensor optical axis by a moving optical deflection device.

18. A system according to claim 1 wherein the radiant sensor scans radiation from multiple remote radiating objects, said objects having LOS angles different from each other so that the sensor's optical axis is aligned with the direct and the reflected radiation from each object at different times.

* * * * *

UNITED STATES PATENT OFFICE
CERTIFICATE OF CORRECTION

PATENT NO. : 3,992,106

DATED : November 16, 1976

INVENTOR(S) : Victor Auerbach

It is certified that error appears in the above-identified patent and that said Letters Patent are hereby corrected as shown below:

Column 6, line 48 delete "sufficient" and insert --sufficiently--; Column 8, line 37 delete "--; and delete "scan" and insert --optical"; Column 8, line 38 delete "axis 16" and also delete "scan" and insert --optical axis 16-- after "of" second occurrence; Column 9, line 18 delete "23" and insert --3--.

Signed and Sealed this

Eighth Day of February 1977

[SEAL]

Attest:

RUTH C. MASON
Attesting Officer

C. MARSHALL DANN
Commissioner of Patents and Trademarks